(12) United States Patent
Shinada et al.

(10) Patent No.: US 11,001,520 B2
(45) Date of Patent: May 11, 2021

(54) OPTICAL FIBER GLASS PREFORM MANUFACTURING METHOD

(71) Applicant: FURUKAWA ELECTRIC CO., LTD., Tokyo (JP)

(72) Inventors: Seiichi Shinada, Tokyo (JP); Akihiro Kanao, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 208 days.

(21) Appl. No.: 15/958,356

(22) Filed: Apr. 20, 2018

(65) Prior Publication Data

US 2018/0237330 A1    Aug. 23, 2018

Related U.S. Application Data

(63) Continuation of application No. PCT/JP2016/082885, filed on Nov. 4, 2016.

(30) Foreign Application Priority Data

Nov. 4, 2015    (JP) .............................. JP2015-216873

(51) Int. Cl.
    *C03B 37/018*    (2006.01)
(52) U.S. Cl.
    CPC ........ *C03B 37/018* (2013.01); *C03B 2203/24* (2013.01); *C03B 2207/64* (2013.01)
(58) Field of Classification Search
    CPC ............ C03B 37/018; C03B 37/01807; C03B 2207/64
    See application file for complete search history.

(56) References Cited

U.S. PATENT DOCUMENTS

| 9,229,160 B2 | 1/2016 | Tamura et al. |
| 2007/0089461 A1 | 4/2007 | Hayami et al. |

(Continued)

FOREIGN PATENT DOCUMENTS

| CN | 1283168 A | 2/2001 |
| CN | 103619767 A | 3/2014 |

(Continued)

OTHER PUBLICATIONS

International Search Report dated Jan. 10, 2017 in PCT/JP2016/082885, filed on Nov. 4, 2016 (with English Translation).

(Continued)

*Primary Examiner* — Cynthia Szewczyk
(74) *Attorney, Agent, or Firm* — Oblon, McClelland, Maier & Neustadt, L.L.P.

(57) ABSTRACT

A method of manufacturing an optical fiber glass preform, the method comprising depositing glass particles on a base material, the glass particles being generated by glass making feedstock gas being supplied while a burner and the base material that is rotating are reciprocated relatively to each other, wherein when a portion corresponding to an outer diameter equal to or more than 0.80 L and equal to or less than L is deposited, wherein L represents a final outer diameter of a part of the optical fiber glass preform manufactured, the part being formed by the deposition of the glass particles, the deposition is performed under a first condition where an angle formed by a first line extending from a center O of a cross section of the base material to a rotational position r0 at which one round trip of the relative reciprocation starts and a second line extending from the center O to a rotational position r1 at which the one round trip of the relative reciprocation ends is an angle excluding 0°, 120°, 240°, 72°, 144°, 216°, and 288°; or the deposition is performed under a second condition where the angle is 120° or (Continued)

240°, thereby to deposit the glass particles to a thickness corresponding to a thickness equal to or less than 0.03 L; or the deposition is performed under a third condition where the angle is 72°, 144°, 216°, or 288°, thereby to deposit the glass particles to a thickness corresponding to a thickness equal to or less than 0.02 L; or the deposition is performed under a fourth condition where the angle is 0°, thereby to deposit the glass particles to a thickness corresponding to a thickness equal to or less than 0.01 L.

4 Claims, 6 Drawing Sheets

(56) References Cited

U.S. PATENT DOCUMENTS

| | | |
|---|---|---|
| 2011/0177333 A1 | 7/2011 | Schoetz et al. |
| 2014/0254997 A1 | 9/2014 | Tamura et al. |
| 2015/0241629 A1 | 8/2015 | Tamura et al. |
| 2017/0203995 A1 | 7/2017 | Schoetz et al. |

FOREIGN PATENT DOCUMENTS

| | | |
|---|---|---|
| JP | 9-118539 | 5/1997 |
| JP | 2007-106616 | 4/2007 |
| JP | 2012-504090 | 2/2012 |
| JP | 2013-43810 | 3/2013 |
| JP | 2013-107792 | 6/2013 |
| JP | 2014-222269 | 11/2014 |
| JP | 2015-157726 | 9/2015 |

OTHER PUBLICATIONS

Written Opinion dated Jan. 10, 2017 in PCT/JP2016/082885, filed on Nov. 4, 2016.

Combined Chinese Office Action and Search Report dated Jul. 30, 2020 in Chinese Patent Application No. 201680062850.1 (with unedited computer generated English translation), 12 pages.

OPTICAL FIBER GLASS PREFORM MANUFACTURING METHOD

CROSS-REFERENCE TO RELATED APPLICATION(S)

This application is a continuation of International Application No. PCT/JP2016/082885, filed on Nov. 4, 2016 which claims the benefit of priority of the prior Japanese Patent Application No. 2015-216873, filed on Nov. 4, 2015, the entire contents of which are incorporated herein by reference.

BACKGROUND

1. Field of the Invention

The present disclosure relates to an optical fiber glass preform manufacturing method.

2. Description of the Related Art

In recent years, sizes of glass preforms for optical fibers have been increased for improvement of manufacturability. Glass preforms for optical fibers are manufactured by well-known methods, including the vapor phase axial deposition (VAD) method, the modified chemical vapor deposition (MCVD) method, and the outside vapor deposition (OVD) method.

Among these, the OVD method is a method, in which glass particles are deposited in a radial direction of a starting material (base material) that is rotating, the glass particles being generated by combustible gas, combustion supporting gas, and glass source gas being introduced to a burner and being caused to undergo a flame hydrolysis reaction. The OVD method is known as a method suitable to obtain large and highly pure porous preforms (Japanese Patent Application Laid-open No. 2007-106616). By sintering a porous preform in a high temperature heating furnace, an optical fiber glass preform is manufactured.

In the MCVD method, source gas and oxygen gas are flown into a rotating glass tube (base material), the glass tube is heated from outside by a burner, glass particles are deposited on an inner surface of the glass tube by heat of the burner that moves along the glass tube, and thereafter, the deposited glass particles are vitrified. By repetition of this process, a glass layer is deposited toward the center of the glass tube. Thereafter, by decrease in viscosity of the glass tube through increase in temperature of the burner, and collapse of a hollow portion at the center; an optical fiber glass preform is manufactured.

However, when a porous preform is manufactured by the OVD method, deposition of glass particles may be biased, and depending on conditions, core eccentricity may be caused. In recent years, since technology for high speed synthesis of porous preforms for optical fibers has advanced, sizes of porous preforms have increased, and the amount of deposition per unit time has increased; there has been a problem that the tendency of the cores to be eccentric has become notable.

SUMMARY

The present disclosure is directed to a method of manufacturing an optical fiber glass preform that is capable of at least partially solving the problems in the conventional technology.

According to an aspect of the present disclosure, a method of manufacturing an optical fiber glass preform is provided. The method includes depositing glass particles on a base material, the glass particles being generated by glass making feedstock gas being supplied while a burner and the base material that is rotating are reciprocated relatively to each other. When a portion corresponding to an outer diameter equal to or more than 0.80 L and equal to or less than L is deposited, wherein L represents a final outer diameter of a part of the optical fiber glass preform manufactured, the part being formed by the deposition of the glass particles, the deposition is performed under a first condition where an angle formed by a first line extending from a center O of a cross section of the base material to a rotational position r0 at which one round trip of the relative reciprocation starts and a second line extending from the center O to a rotational position r1 at which the one round trip of the relative reciprocation ends is an angle excluding 0°, 120°, 240°, 72°, 144°, 216°, and 288°; or the deposition is performed under a second condition where the angle is 120 or 240°, thereby to deposit the glass particles to a thickness corresponding to a thickness equal to or less than 0.03 L; or the deposition is performed under a third condition where the angle is 72°, 144°, 216°, or 288°, thereby to deposit the glass particles to a thickness corresponding to a thickness equal to or less than 0.02 L; or the deposition is performed under a fourth condition where the angle is 0°, thereby to deposit the glass particles to a thickness corresponding to a thickness equal to or less than 0.01 L. The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinafter, an embodiment of an optical fiber glass preform manufacturing method according to the present disclosure will be described in detail, based on the drawings.

Figure 1:
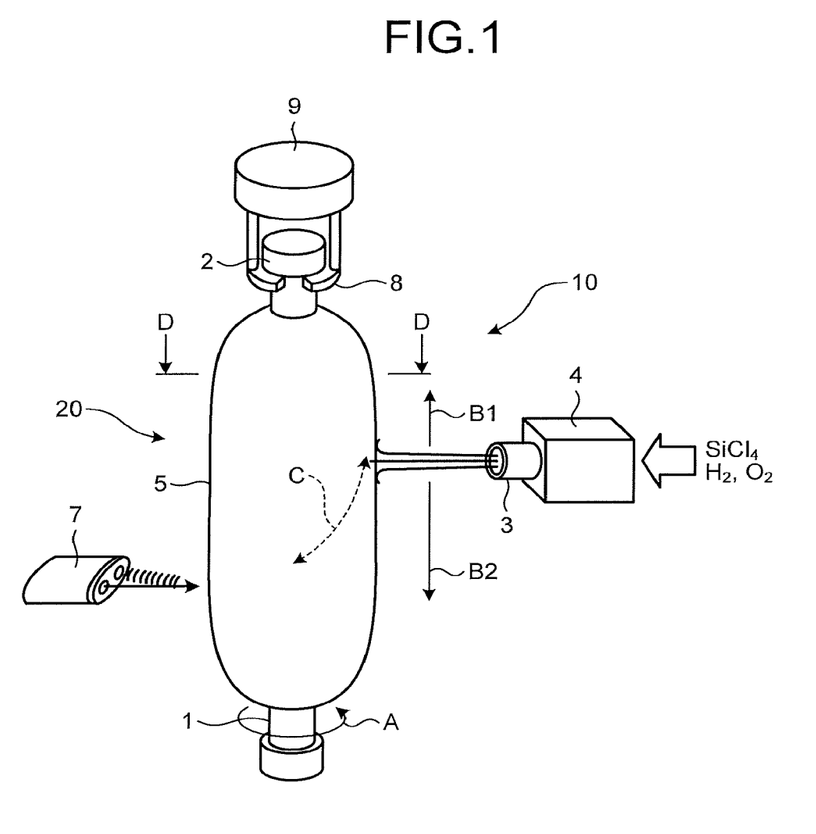
FIG. 1 is an explanatory diagram illustrating main parts of a manufacturing apparatus used in manufacture of an optical fiber glass preform.
Figure 2:
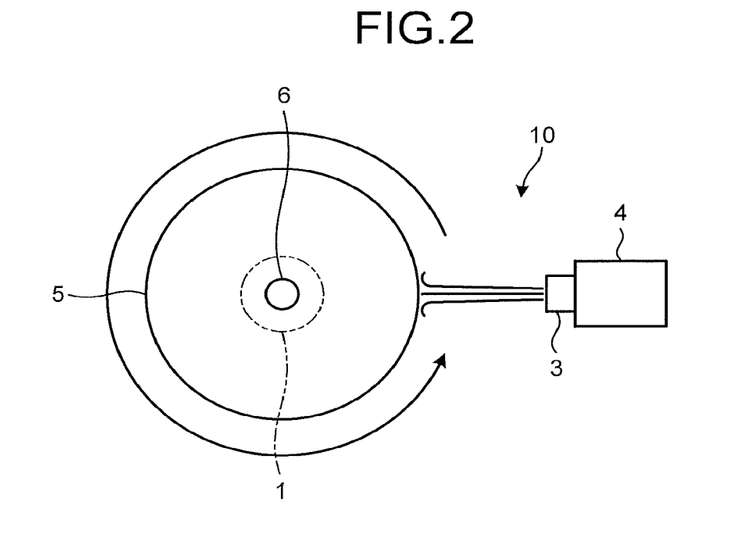
FIG. 2 is an explanatory diagram illustrating a D-D cross section in FIG. 1.
Figure 3A:
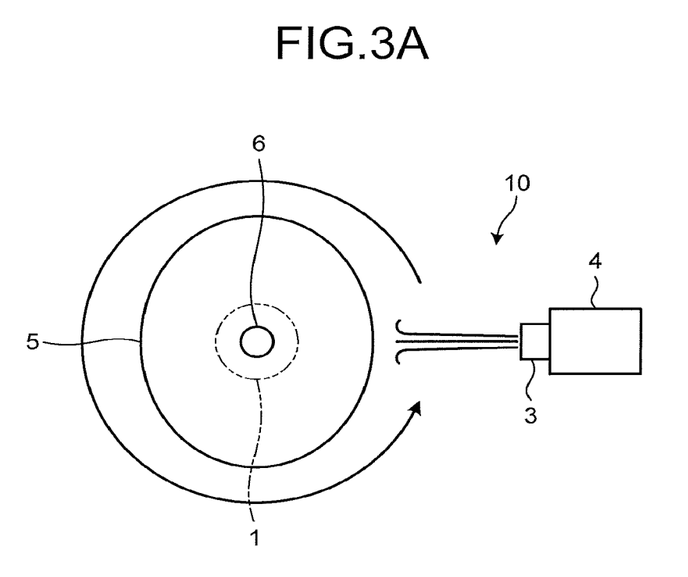
FIG. 3A is an explanatory diagram illustrating a state where a cladding portion has deposited non-circularly.
Figure 3B:
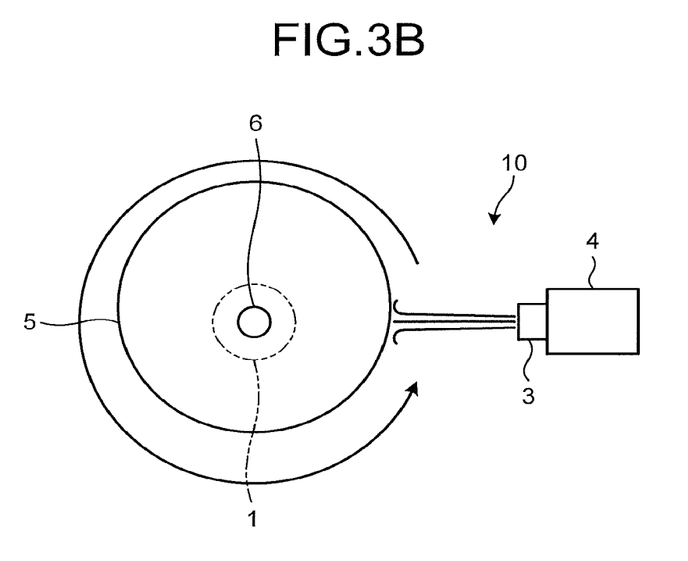
FIG. 3B is an explanatory diagram illustrating a state where a core has become eccentric.
Figure 4:
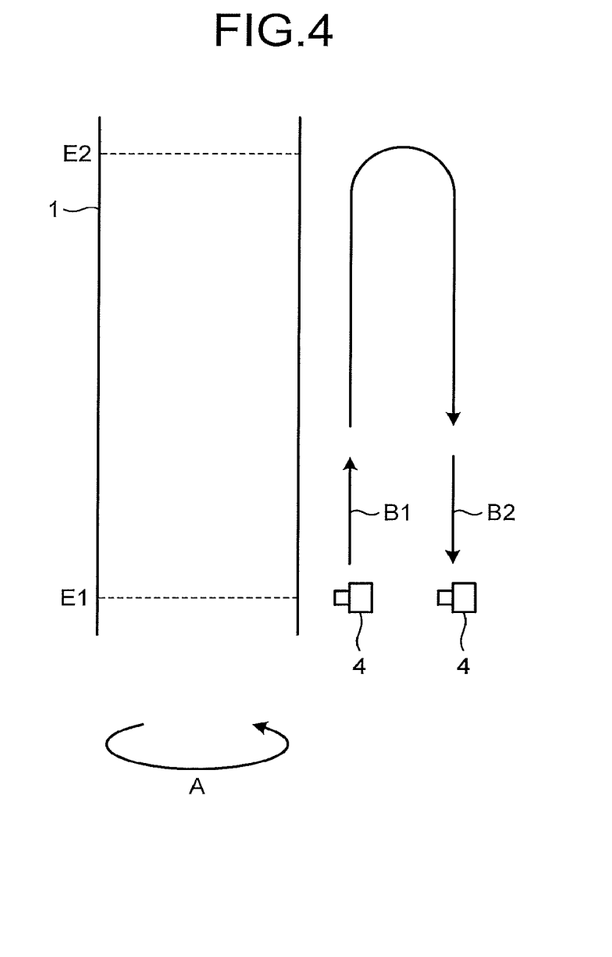
FIG. 4 is an explanatory diagram for a start position of reciprocation in a longitudinal direction and a position returned after one round trip.
Figure 6:
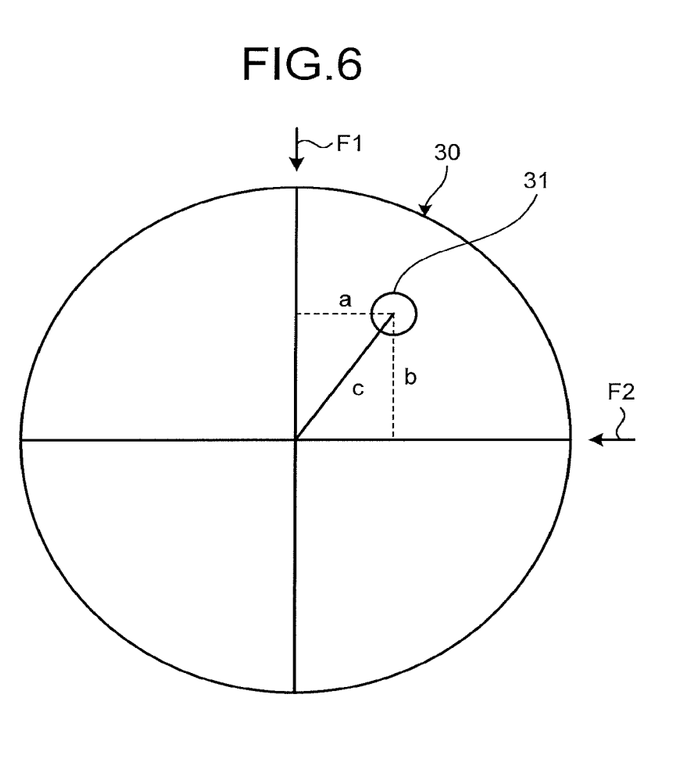
FIG. 6 is an explanatory diagram illustrating an amount of core eccentricity.
Figure 7:
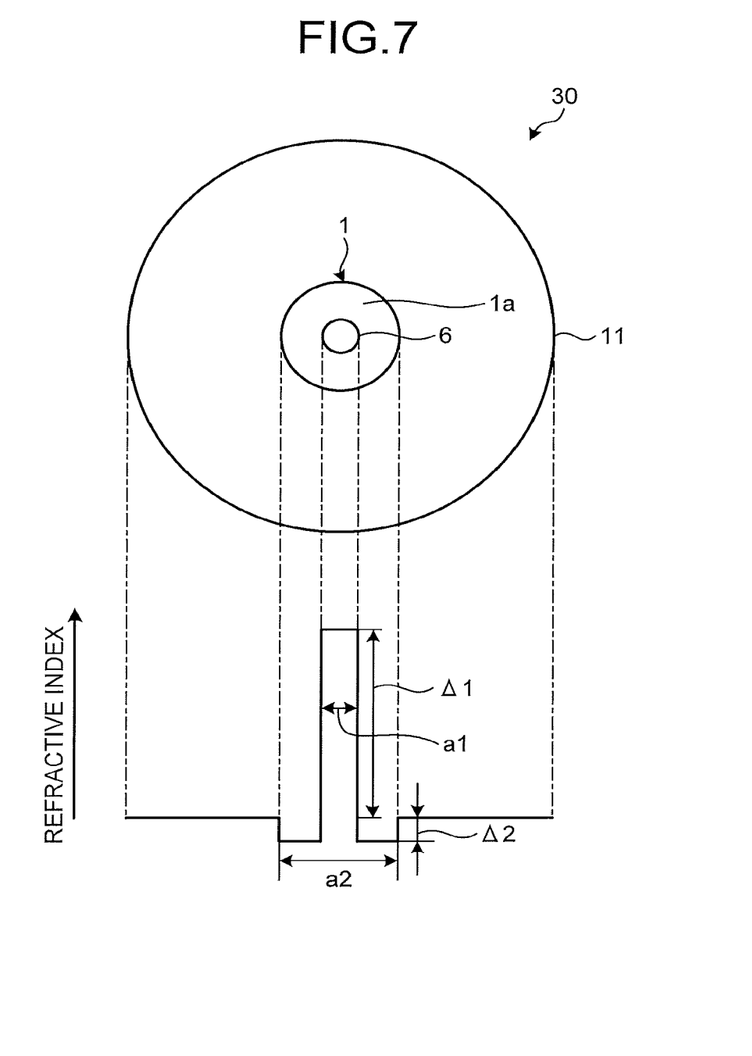
FIG. 7 is an explanatory diagram illustrating an example of a refractive index profile of an optical fiber glass preform.

FIG. 1 is an explanatory diagram illustrating main parts of a manufacturing apparatus used to manufacture an optical fiber glass preform. FIG. 2 is an explanatory diagram illustrating a D-D cross section in FIG. 1. FIG. 3A is an explanatory diagram illustrating a state where a cladding portion has deposited non-circularly. FIG. 3B is an explanatory diagram illustrating a state where a core has become eccentric. FIG. 4 is an explanatory diagram for a start position of reciprocation in a longitudinal direction and a position returned after one round trip. FIG. 5A to FIG. 5D are each an explanatory diagram illustrating a deviation angle per one round trip. FIG. 6 is an explanatory diagram illustrating an amount of core eccentricity. FIG. 7 is an explanatory diagram illustrating an example of a refractive index profile of an optical fiber glass preform.

Firstly, a porous preform 20 is manufactured by use of a manufacturing apparatus 10 illustrated in FIG. 1. This embodiment is implemented by the so-called OVD method. A target rod 1 are pivotally supported at both ends thereof by supporting portions 2 and 2. A driving mechanism not illustrated is controlled by a controller not illustrated, and rotates the target rod 1 at a predetermined velocity in a predetermined rotational direction as illustrated with an arrow A. Further, in this state, the driving mechanism causes a glass particle synthesizing burner 4 to linearly reciprocate as illustrated with arrows B1 and B2 in an axial direction of the target rod 1.

To the glass particle synthesizing burner 4, $SiCl_4$ gas, which is glass source gas, and $H_2$ gas and $O_2$ gas, which are combustion gases, are supplied; and glass particles are synthesized by flame hydrolysis of the glass source gas in flame formed by the combustion gases. The glass particles are jetted out from a flame injection port 3 toward an outer periphery of the rotating target rod 1 (obtained, in many cases, by vitrifying a core rod having thereon a part of a cladding portion), and deposited thereon as a glass particulate deposit 5, thereby to manufacture the porous preform 20.

It is sufficient when the glass particle synthesizing burner 4 reciprocates relative to the rotating target rod 1 in the axial direction. While the glass particle synthesizing burner 4 reciprocates relative to the target rod 1 in this embodiment, the rotating target rod 1 may linearly reciprocate in a rotation axis direction relative to the glass particle synthesizing burner 4 that stays at rest in other embodiments.

The target rod 1 is rotatably suspended at an upper end thereof by a chuck 8 extending from a weight measuring device 9. The weight measuring device 9 measures a weight of the glass particles deposited onto the target rod 1. At a position lateral to and away from the target rod 1 by a predetermined distance, an outer diameter measuring device 7 is arranged. The outer diameter measuring device 7 measures an outer diameter of the glass particulate deposit 5, from a time period during which a laser beam is emitted therefrom, reflected at a surface of the glass particulate deposit 5, and returned thereto.

Generally, initially in the glass particle deposition, the glass particulate deposit on the target rod 4 is still thin. Therefore, the higher the relative motion velocity of the target rod 1 and the glass particle synthesizing burner 4 and the rotation velocity of the target rod 1 are made, the higher the glass particle deposition efficiency becomes. In the middle of the deposition, the target has become thick to a certain extent. In this case, if the relative motion velocity of the glass particle synthesizing burner 4 and the rotation velocity of the target rod 1 are fast, the glass particle deposition density is decreased. Therefore, as the synthesis proceeds, the relative motion velocity and the rotation velocity of the target rod 1 are gradually decreased, and the glass particle deposition density is adjusted to be kept at a desired value. In particular, in order to realize a large-sized optical fiber glass preform, deposition density of glass particles to be deposited is preferably increased, in view of constraints such as dimensions of an existing facility.

When the porous preform 20 is sintered and vitrified, a volume of the glass particulate deposit 5 is decreased (increased in density), which causes the porous preform 20 to be decreased in diameter, and thus the porous preform 20 is formed into an optical fiber glass preform. Therefore, the outer diameter of the optical fiber glass preform is not necessarily the same as the outer diameter of the porous preform 20. Here, a final outer diameter of a portion of the manufactured optical fiber glass preform will be represented by L, the portion having been formed by deposition of glass particles, and the deposited thickness and the outer diameter of the glass particulate deposit 5 during the deposition will be represented by values with reference to L. For example, a thickness corresponding to a thickness of 0.01 L or less is a glass particle deposition thickness along a radial direction that results in a thickness of 0.01 L or less in the optical fiber glass preform. Further, for example, a portion corresponding to an outer diameter of 0.80 L or more and L or less during the deposition is a portion of the glass particulate deposit 5, which results in a portion having a radial direction length of 0.80 L or more and L or less from a central axis in the optical fiber glass preform.

Particularly, for a portion corresponding to 0.80 L or more and L or less where density tends to be decreased, deposition is preferably performed such that density $\rho_c$ (g/cm$^3$) of the glass particulate deposit 5 is in a range of 0.5 g/cm$^3$ or more and 0.9 g/cm$^3$ or less, and more preferably in a range of 0.7 g/cm$^3$ or more and 0.9 g/cm$^3$ or less.

If the density of the portion of the glass particulate deposit 5 is greater than 0.9 (g/cm$^3$), the portion corresponding to the outer diameter of 0.80 L or more and L or less; dehydration in the subsequent vitrification process may become insufficient, and a transmission loss at a wavelength of 1380 nm in an optical fiber manufactured by use of this preform may be increased. Further, if the density of the portion of the glass particulate deposit 5 becomes less than 0.5 (g/cm$^3$), the portion corresponding to the outer diameter of 0.80 L or more and L or less; L is increased as a result, and this, for example, is disadvantageous for increase in size of the preform since the preform size that is able to be sintered in the existing facility is decreased. Further, the density is preferably 0.7 (g/cm$^3$) or greater because L can be further decreased.

Further, the density of the glass particles deposited varies according to the outer diameter of the glass particulate deposit 5 if the rotation velocity r (rpm) is the same and the relative motion (traverse) velocity V (mm/min) is the same. Therefore, in order for the density to be kept at a desired value, deposition is preferably performed while the rotation velocity r (rpm) of the target rod and the relative motion velocity V (mm/min) between the target rod 1 and the glass particle synthesizing burner 4 are changed.

If the deposition is continued such that a central line of soot spirally deposited as illustrated with an arrow C (FIG. 1) by relative motion of one round trip (traverse) overlaps a central line of soot deposited in the previous traverse; soot (a collection of glass particles) is unevenly deposited (or biased), which may lead to a non-circular cladding portion or core eccentricity, as illustrated in FIG. 3A and FIG. 3B. In FIG. 3A and FIG. 3B, a reference sign 6 represents a core portion included in the target rod 1. A region around the core portion 6 in the target rod 1 is the cladding portion.

Further, not only when the central line of the soot deposited overlaps the central line of the soot deposited in the previous traverse, but also when the rotation velocity r (rpm) of the target rod 1, the relative motion velocity V (mm/min) between the target rod 1 and the glass particle synthesizing burner 4, and a distance D (mm) of one round trip of traverse are in particular conditions, as illustrated in FIG. 3A and FIG. 3B, the glass particulate deposit 5 formed under such conditions may result in the non-circular cladding portion, or cause the core eccentricity.

Hereinafter, description will be made in more detail.

When the rotation velocity of the target rod 1 is r (rpm), the relative motion velocity between the target rod 1 and the glass particle synthesizing burner 4 is V (mm/min), a sweep pitch of the burner represented by V/r is P (mm), and the movement distance of one round trip of the relative motion between the target rod 1 and the glass particle synthesizing burner 4 is D (mm); a numerical value represented by D/P is defined as "A+f" (being rounded off to two decimal places), for the sake of explanation. "A" is an integer equal to or greater than 0, and "f" is a value less than 1.00. For example, for 1.33, "A" is 1 and "f" is 0.33.

If the glass particle synthesizing burner 4 and the target rod 1 move relative to each other at different velocities in going and coming paths (or upward and downward paths in FIG. 4) of the reciprocating movement, (D1/P1)+(D2/P2), rather than D/P, is defined as "A+f", wherein the relative motion velocity in the going path is V1; the movement distance therein is D1; the relative motion velocity in the coming path is V2; the movement distance therein is D2; P1=V1/r; and P2=V2/r.

FIG. 4 is an explanatory diagram for a start position and a position returned after one round trip in reciprocation along a longitudinal direction. The glass particle synthesizing burner 4 starts from a position E1 in the longitudinal direction of the target rod 1 rotating in the direction of the arrow A; moves in the longitudinal direction as shown with the arrow B1; turns at a position E2; and moves backward to the position E1 in the longitudinal direction as shown with the arrow B2. As described above, the going path and the coming path of the relative motion may have movement distances different from each other. In that case, the glass particle synthesizing burner 4 may stop at a position higher than the position E1, or may move to a position lower than the position E1, in its coming path. Further, the glass particle synthesizing burner 4 may turns at a position deviated from the position E2.

Figure 5A:
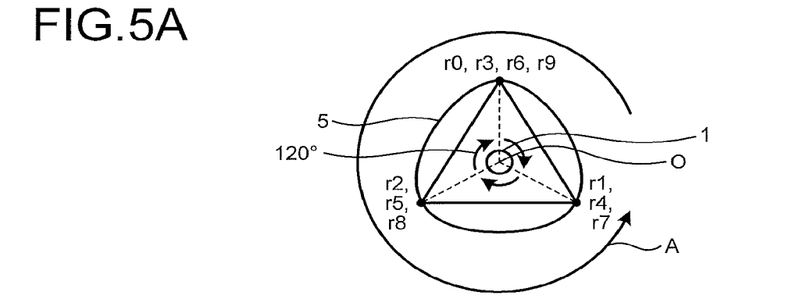
FIG. 5A is an explanatory diagram illustrating a state where a deviation angle per one round trip is 120°.

Firstly, as illustrated in FIG. 5A, an angle, which is formed by a line extending from the center O of a cross section of the target rod 1 to a rotational position r0 from which the glass particle synthesizing burner 4 starts its one round trip and a line extending from the center O to a rotational position r1, as an original position, to which the glass particle synthesizing burner 4 returns after one round trip, may become 120°, that is, a deviation angle per one round trip may become 120°.

As described above, the movement distances may be different in the going and coming paths of the relative motion. In that case, the glass particle synthesizing burner 4 may return to a position different from the position E1, or may move farther than the position E1. However, a deviation angle per one round trip is defined for a case where the glass particle synthesizing burner 4 returns to the position E1 with the spiral route being maintained with respect to the target rod 1.

In this case, a rotational position r2 where the glass particle synthesizing burner 4 returns to the original position after two round trips is deviated further by 120°. Further, a rotational position r3 where the glass particle synthesizing burner 4 returns to the original position after three round trips is deviated further by 120°, and matches the rotational position r0. Furthermore, if the glass particle synthesizing burner 4 makes nine round trips in the axial direction, rotational positions r4, r5, r6, r7, r8, and r9 are deviated in turn by 120° per one round trip.

That is, in the relative motion between the target rod 1 and the glass particle synthesizing burner 4, the glass particle synthesizing burner 4 passes the same start position of the traverse in reciprocation once per three round trips. As a result, a triangular shape having three vertices is formed. In other words, if the glass particle synthesizing burner 4 makes nine round trips in the axial direction, the glass particle synthesizing burner 4 traces the same route with respect to the target rod 1 three times. As a result, the glass particulate deposit 5 has a triangular cross section, where a distance from the center of the core portion 6 (core center) to a portion positioned at a vertex of the triangle differs from a distance from the core center to a portion positioned on a side of the triangle, and thus core eccentricity is caused.

More specifically, when the cross section of the glass particulate deposit 5 becomes triangular, a place where soot is deposited the most (a vertex) and a place where the soot is deposited the least (a side), relatively to the core center, oppose each other, with the core center interposed therebetween. When an optical fiber is manufactured by stretching an optical fiber glass preform manufactured thereafter, internal force making the outer shape of the optical fiber closer to a circular shape is caused in the optical fiber, but since the vertices and the sides oppose each other as described above, internal force is biased with respect to the core portion 6. As a result, the difference in the amount of deposition of soot (difference in distance from the core center to the outer periphery of the preform) is not reduced even by the stretching, and core eccentricity is caused.

This angle deviation of 120° is caused when "A" in "A+f" is an arbitrary integer equal to or greater than 0 and "f" is 0.33. Further, a similar phenomenon occurs when "f" is 0.66 or 0.00. When "f" is 0.66, the deviation angle per one round trip is 240°.

Figure 5B:
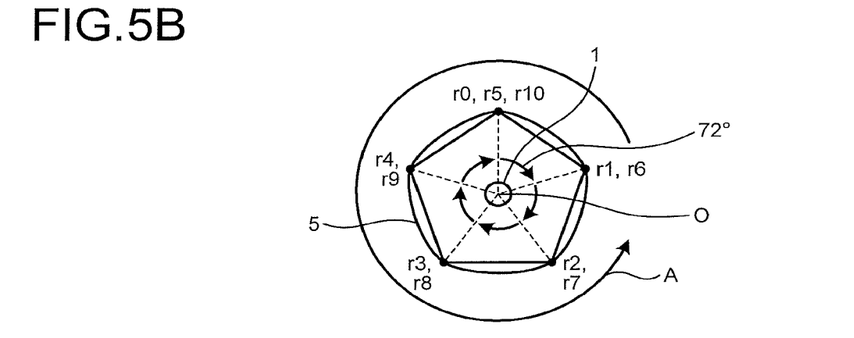
FIG. 5B is an explanatory diagram illustrating a state where the deviation angle per one round trip is 72°.

Further, as illustrated in FIG. 5B, an angle formed by a line extending from a center O of the cross section of the target rod 1 to the rotational position r0 and a line extending from the center O to the rotational position r1 may become 72°. Namely, the deviation angle per one round trip may become 72°. In that case, the rotational position r2 where the glass particle synthesizing burner 4 returns to the original position after two round trips is deviated further by 72°. Furthermore, the rotational position r3 where the glass particle synthesizing burner 4 returns to the original position after three round trips is deviated further by 72°. Moreover, if the glass particle synthesizing burner 4 makes ten round trips in the axial direction, the rotational positions r4, r5, r6, r7, r8, r9, and r10 are deviated in turn by 72° once per one round trip.

That is, in the relative motion between the target rod 1 and the glass particle synthesizing burner 4, the glass particle synthesizing burner 4 passes the same start position of the traverse in reciprocation, tracing the same route once per five round trips of reciprocation. As a result, a pentagonal shape having five vertices is formed. In other words, if the glass particle synthesizing burner 4 makes ten round trips in the axial direction, the glass particle synthesizing burner 4 traces the same route with respect to the target rod 1 twice. As a result, the glass particulate deposit 5 has a pentagonal cross section. Similarly to the case where the cross section of the glass particulate deposit 5 is formed triangularly, a distance from the core center to a portion positioned at a vertex differs from a distance from the core center to a portion positioned on a side; and thus core eccentricity is caused.

That is, when the glass particulate deposit 5 becomes pentagonal in cross section, similarly to the case where the glass particulate deposit 5 becomes triangular in cross section, a place where soot is deposited the most (a vertex) and a place where the soot is deposited the least (a side), relatively to the core center, oppose each other, with the core center interposed therebetween; and thus the difference between the amounts of soot deposited is not reduced even if stretching is performed and core eccentricity is caused.

This angle deviation of 72° is caused when "A" in "A+f" is an arbitrary integer equal to or greater than 0, and "f" is 0.20. Further, a similar phenomenon occurs when "f" is 0.40, 0.60, 0.80, or 0.00. If "f" is 0.40, 0.60, or 0.80, the deviation angle per one round trip is respectively 144°, 216°, or 288°. In both of the cases in FIG. 5A and FIG. 5B, when variation in the value of "f" is within ±0.01, the core eccentricity phenomenon is caused.

If the glass particulate deposit 5 has a cross-sectional shape of square, vertices oppose each other and sides oppose each other with the core center interposed therebetween, and thus the internal force is scarcely biased with respect to the core portion 6. As a result, bias in the internal force acting on the core portion 6 is small, and core eccentricity is small to a non-problematic extent or not caused. Further, if the glass particulate deposit 5 becomes heptagonal or polygonal with more vertices, the vertices and sides oppose each other with the core center interposed therebetween. However, as compared to the triangular or pentagonal case, the difference between a place where soot is deposited the most and a place where the soot is deposited the least is small and the outer shape is closer to a circle. Therefore, core eccentricity is small to a non-problematic extent or not caused.

When deposition of a portion corresponding to 0.80 L or more and L or less is performed, the deposition being in the final stage of a glass particle deposition process; since the amount of deposition per layer is large and the amount of glass particles deposited further thereon is small, core eccentricity is largely influenced in particular. Therefore, in deposition of a portion corresponding to an outer diameter of 0.80 L or more and L or less, if the deposition is performed under a first condition where the angle formed by the line extending from the center O of the cross section to the rotational position r0 and the line extending from the center O to the rotational position r1 is an angle excluding 0°, 120°, 240°, 72°, 144°, 216°, and 288°, core eccentricity is able to be kept small. This first condition is approximately equivalent to deposition being performed with "A+f" being set to be included in a range of "A+0.01"<"A+f"<"A+0.19", or "A+0.21"<"A+f"<"A+0.32", or "A+0.34"<"A+f"<"A+0.39", or "A+0.41"<"A+f"<"A+0.59", or "A+0.61"<"A+f"<"A+0.65", or "A+0.67"<"A+f"<"A+0.79", or "A+0.81"<"A+f"<"A+0.99", where "A" is an arbitrary integer equal to or greater than 0.

Further, when deposition is performed under a second condition where the angle formed by the line extending from the center O of the cross section to the rotational position r0 and the line extending from the center O to the rotational position r1 is 120° or 240°, if the glass particles are deposited to a thickness corresponding to a thickness of 0.03 L or less, core eccentricity is able to be kept small. This second condition is approximately equivalent to deposition being performed with "A+f" being set to be included in a range of "A+0.32"≤"A+f"≤"A+0.34", which is around "A+0.33", or "A+0.65"≤"A+f"≤"A+0.67", which is around "A+0.66", where "A" is an arbitrary integer equal to or greater than 0.

Further, when deposition is performed under a third condition where the angle formed by the line extending from the center O of the cross section to the rotational position r0 and the line extending from the center O to the rotational position r1 is 72°, 144°, 216°, or 288°, if the glass particles are deposited to a thickness corresponding to a thickness of 0.02 L or less, core eccentricity is able to be kept small. This third condition is approximately equivalent to deposition being performed with "A+f" being set to be included in any of ranges of: "A+0.19"≤"A+f"≤"A+0.21", which is around "A+0.20"; and "A+0.39"≤"A+f"≤"A+0.41", "A+0.59"≤"A+f"≤"A+0.61", and "A+0.79"≤"A+f"≤"A+0.81", which are respectively around "A+0.40", "A+0.60", and "A+0.80", where "A" is an arbitrary integer equal to or greater than 0.

Further, when deposition is performed under a fourth condition where the angle formed by the line extending from the center O of the cross section to the rotational position r0 and the line extending from the center O to the rotational position r1 is 0°, if the glass particles are deposited to a thickness corresponding to a thickness of 0.01 L or less, core eccentricity is able to be kept small. This fourth condition is approximately equivalent to deposition being performed with "A+f" being set to be included in a range of "A+0.99"≤"A+f"≤"(A+1)+0.01", which is around "A+0.00", where "A" is an arbitrary integer equal to or greater than 0.

As understood from the expression, "A+0.99"≤"A+f"≤"(A+1)+0.01", the integer portion on the right side is a numerical value larger by 1 than the integer portion on the right side. Similarly, if "f" is in a range striding across 0.00, the integer portion on the right side becomes larger than the integer portion on the left side by 1.

Further, in deposition of a portion corresponding to 0.50 L or more and less than 0.80 L, the deposition being in the latter half of the glass particle deposition process, core eccentricity may be influenced. Therefore, in the deposition of the portion corresponding to 0.50 L or more and less than 0.80 L, similarly to the above-described cases, deposition is preferably performed under any of the first to fourth conditions. If the deposition is performed under the second condition, the glass particles are preferably deposited to a thickness corresponding to a thickness equal to or less than 0.03 L. If the deposition is performed under the third condition, the glass particles are preferably deposited to a thickness corresponding to a thickness equal to or less than 0.02 L. If the deposition is performed under the fourth condition, the glass particles are preferably deposited to a thickness corresponding to a thickness equal to or less than 0.01 L.

Figure 5C:
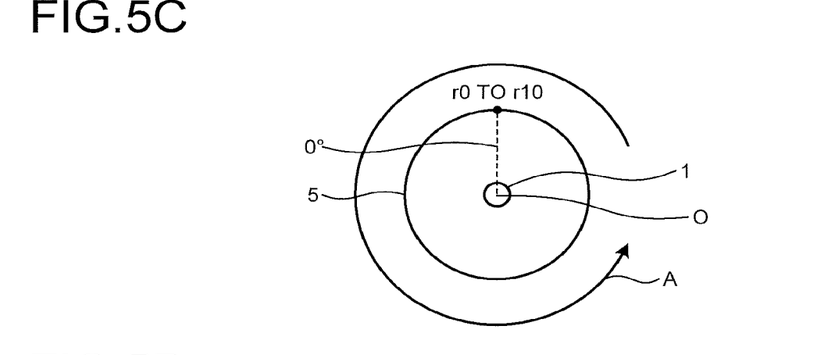
FIG. 5C is an explanatory diagram illustrating a state where the deviation angle per one round trip is 0°.

FIG. 5C illustrates a case where the angle formed by the line extending from the center O of the cross section to the rotational position r0 and the line extending from the center O to the rotational position r1 is 0°, and thus the deviation angle per one round trip is 0°. This case is approximately equivalent to deposition being performed with "f=0.00" being set. That is, in relative motion between the target rod 1 and the glass particle synthesizing burner 4, the rotational position at the start and the rotational positions at the start of traverse after every one round trip r0 to r10 are all at the same position; and if the glass particle synthesizing burner 4 reciprocates ten times in the axial direction, since the glass particle synthesizing burner 4 traces the same route ten times, deposition is biased, and a phenomenon, in which the cladding becomes non-circular (cladding non-circularity), is also caused.

Figure 5D:
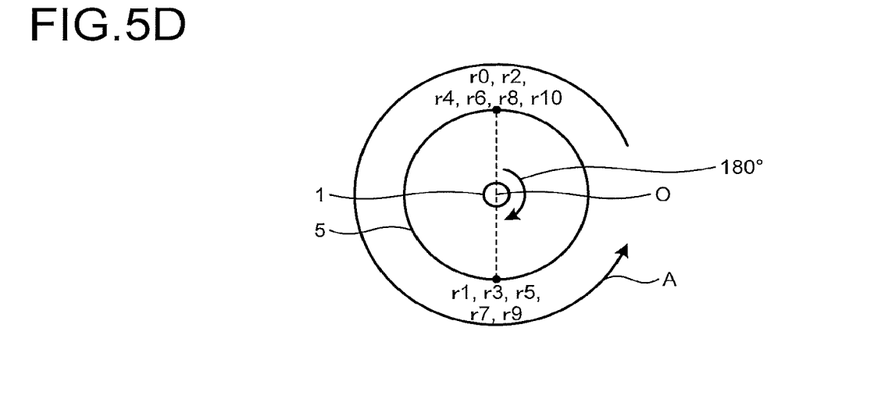
FIG. 5D is an explanatory diagram illustrating a state where the deviation angle per one round trip is 180°.

Further, FIG. 5D illustrates a case where the angle formed by the line extending from the center O of the cross section to the rotational position r0 and the line extending from the center O to the rotational position r1 is 180°, and the deviation angle per one round trip is 180°. This case is approximately equivalent to deposition being performed with "f=0.50" being set for "A+f", where "A" is an arbitrary integer equal to or greater than 0. That is, in relative motion between the target rod 1 and the glass particle synthesizing burner 4, the rotational positions r0 to r10 at the start of traverse when one round trip has been made are at the same position every time two round trips of reciprocation are made, and if the glass particle synthesizing burner 4 reciprocates ten times in the axial direction, since the glass particle synthesizing burner 4 traces the same route with respect to the target rod 1 five times, deposition is biased, and a phenomenon, in which the cladding becomes non-circular (cladding non-circularity) is caused. If variation in the value of "f" is within ±0.01, the cladding non-circularity phenomenon is caused.

When deposition of a portion corresponding to 0.80 L or more and L or less in the optical fiber glass preform is performed under the condition where cladding non-circularity is caused as described above, the deposition being in the final stage of the glass particle deposition process; the cladding non-circularity is largely influenced in particular. Therefore, when deposition is performed under the fourth condition where the angle formed between by the line extending from the center O of the cross section to the rotational position r0 and the line extending from the center O to the rotational position r1 is 0°, if the glass particles are deposited to a thickness corresponding to a thickness equal to or less than 0.01 L, cladding non-circularity is also able to be kept small.

Further, when deposition is performed under a fifth condition where the angle formed by the line extending from the center O of the cross section to the rotational position r0 and the line extending from the center O to the rotational position r1 is an angle excluding 180°, or when deposition is performed under a sixth condition where the angle is 180°, if the glass particles are deposited to a thickness corresponding to a thickness equal to or less than 0.02 L, cladding non-circularity is able to be kept small. This sixth condition is approximately equivalent to deposition being performed with "A+f" being set to be included in a range of "A+0.49"≤"A+f"≤"A+0.51", which is around "A+0.50", where "A" is an arbitrary integer equal to or greater than 0.

Further, also in deposition of a portion corresponding to 0.50 L or more and less than 0.80 L, the deposition being in the latter half of the glass particle deposition process, cladding non-circularity may be influenced. When the portion corresponding to 0.50 L or more and less than 0.80 L is deposited, preferably, the glass particles are deposited to thickness corresponding to a thickness equal to or less than 0.01 L under the fourth condition, or the glass particles are deposited to a thickness corresponding to a thickness equal to or less than 0.02 L under the fifth condition.

By dehydration sintering of the manufactured porous preform by a known method, an optical fiber glass preform is obtained.

A core eccentricity and a cladding non-circularity of an optical fiber are found by measurement of an optical fiber glass preform obtained by sintering and vitrification of a porous preform manufactured. A core eccentricity c (FIG. 6) in an optical fiber glass preform 30 is found, by use of Equation (1) below, from deviation amounts "a" and "b" of the central axis of a core 31 from the central axis of the optical fiber glass preform 30 when a central axis direction of the optical fiber glass preform 30 is seen from directions F1 and F2 forming 90 degrees with each other, as illustrated in FIG. 6.

$$c=(a^2+b^2)^{1/2} \quad (1)$$

A core eccentricity of the optical fiber manufactured from the optical fiber glass preform 30 is able to be found by converting the core eccentricity c found from Equation (1), namely by multiplication of the core eccentricity c by a ratio of "outer diameter of optical fiber"/"outer diameter of optical fiber glass preform 30".

Next, a cladding non-circularity is a value obtained by: measurement of a non-circularity rate, which is a value representing, with a percentage relative to the average cladding diameter, a difference between diameters of two circles from the maximum and minimum outer diameters by rotation of an optical fiber glass preform; and conversion of the non-circularity rate into a non-circularity amount of an optical fiber formed therefrom.

TABLE 1

|  | Sample 1 | Sample 2 | Sample 3 | Sample 4 | Sample 5 | Sample 6 |
|---|---|---|---|---|---|---|
| a | 0.32 | 0.21 | 0.66 | 0.61 | 0.55 | 0.66 |
| Outer diameter [mm] | 0.978L | 0.955L | 0.985L | 0.970L | 0.955L | 0.978L |
| Thickness [mm] | 0.00820L | 0.01367L | 0.01258L | 0.02461L | 0.045L | 0.00820L |
| Core eccentricity [μm] | 0.30 | 0.25 | 0.36 | 0.35 | 0.21 | 0.31 |
| Non-circularity [μm] | 0.25 | 0.15 | 0.28 | 0.17 | 0.18 | 0.24 |

|  | Sample 7 | Sample 8 | Sample 9 | Sample 10 | Sample 11 | Sample 12 |
|---|---|---|---|---|---|---|
| a | 0.79 | 0.32 | 0.32 | 0.33 | 0.20 | 0.34 |
| Outer diameter [mm] | 0.955L | 0.800L | 0.500L | 0.955L | 0.955L | 0.800L |

TABLE 1-continued

| | | | | | | |
|---|---|---|---|---|---|---|
| Thickness [mm] | 0.01367L | 0.01367L | 0.01367L | 0.02188L | 0.03281L | 0.02735L |
| Core eccentricity [μm] | 0.24 | 0.27 | 0.24 | 0.51 | 0.43 | 0.40 |
| Non-circularity [μm] | 0.16 | 0.20 | 0.16 | 0.39 | 0.28 | 0.36 |

Table 1 and Table 2 have therein results of investigation of core eccentricities and cladding non-circularities of longitudinal central portions of optical fiber glass preforms that have undergone vitrification, by manufacture of porous preforms for single mode fibers conforming to ITU-T G.652 with manufacturing conditions being variously changed. Further, for each of these samples, as synthesis and deposition of glass particles proceeded, relative motion velocity and rotation velocity of the target rod 1 were gradually decreased, and density of the glass particles was adjusted to be kept at a desired value. Specifically, when a portion corresponding to a portion of 0.80 L or more and L or less was deposited, the deposition was performed while sweep pitch P (mm) was changed such that the density $\rho_c$ (g/cm³) was in a range where $0.7 \leq \rho_c \leq 0.9$ (g/cm³).

Further, for these samples, manufacturing conditions for the portions corresponding to the portions of 0.80 L or less were the same, and for the portions corresponding the portions of 0.50 L or more and 0.80 L or less, manufacture was performed with D/P being set at a value enabling both of core eccentricity and cladding non-circularity described above to be kept small.

Further, for the portions corresponding to the portions of 0.80 L or more and L or less, manufacture was performed with D/P being set at a value enabling both of core eccentricity and cladding non-circularity described above to be kept small, though not particularly listed in the tables.

A sample 1 was manufactured by forming at "f=0.32" a portion having a thickness corresponding to a thickness of 0.00820 L, from a position corresponding to an porous preform outer diameter of 0.978 L. The core eccentricity of the optical fiber, which was obtained by converting the core eccentricity c of the optical fiber glass preform by use of the above-mentioned ratio (the same hereinafter), was 0.30 μm, which was equal to or less than 0.40 μm suitable for connection loss to be kept low. Further, the cladding non-circularity was 0.25 μm, which was equal to or less than 0.40 μm suitable for connection loss to be kept low.

A sample 2 was manufactured by forming at "f=0.21" a portion having a thickness corresponding to a thickness of 0.01367 L, from a position corresponding to an porous preform outer diameter of 0.955 L. The core eccentricity of the optical fiber was 0.25 μm, which was equal to or less than 0.40 μm suitable for connection loss to be kept low. Further, the cladding non-circularity was 0.15 μm, which was equal to or less than 0.40 μm suitable for connection loss to be kept low.

A sample 3 was manufactured by forming at "f=0.66" a portion having a thickness corresponding to a thickness of 0.01258 L, from a position corresponding to an porous preform outer diameter of 0.985 L. The core eccentricity of the optical fiber was 0.36 μm, which was equal to or less than 0.40 μm suitable for connection loss to be kept low. Further, the cladding non-circularity was 0.28 μm, which was equal to or less than 0.40 μm suitable for connection loss to be kept low.

A sample 4 was manufactured by forming at "f=0.61" a portion having a thickness corresponding to a thickness of 0.02461 L, from a position corresponding to an porous preform outer diameter of 0.970 L. The core eccentricity of the optical fiber was 0.35 μm, which was equal to or less than 0.40 μm suitable for connection loss to be kept low. Further, the cladding non-circularity was 0.17 μm, which was equal to or less than 0.40 μm suitable for connection loss to be kept low.

A sample 5 was manufactured by forming at "f=0.55" a portion having a thickness corresponding to a thickness of 0.045 L, from a position corresponding to an porous preform outer diameter of 0.955 L. The core eccentricity of the optical fiber was 0.21 μm, which was equal to or less than 0.40 μm suitable for connection loss to be kept low. Further, the cladding non-circularity was 0.18 μm, which was equal to or less than 0.40 μm suitable for connection loss to be kept low.

A sample 6 was manufactured by forming at "f=0.66" a portion having a thickness corresponding to a thickness of 0.00820 L, from a position corresponding to an porous preform outer diameter of 0.978 L. The core eccentricity of the optical fiber was 0.31 μm, which was equal to or less than 0.40 μm suitable for connection loss to be kept low. Further, the cladding non-circularity was 0.24 μm, which was equal to or less than 0.40 μm suitable for connection loss to be kept low.

A sample 7 was manufactured by forming at "f=0.79" a portion having a thickness corresponding to a thickness of 0.01367 L, from a position corresponding to a porous preform outer diameter of 0.955 L. The core eccentricity of the optical fiber was 0.24 μm, which was equal to or less than 0.40 μm suitable for connection loss to be kept low. Further, the cladding non-circularity was 0.16 μm, which was equal to or less than 0.40 μm suitable for connection loss to be kept low.

A sample 8 was manufactured by forming at "f=0.32" a portion having a thickness corresponding to a thickness of 0.01367 L, from a position corresponding to an porous preform outer diameter of 0.800 L. The core eccentricity of the optical fiber was 0.27 μm, which was equal to or less than 0.40 μm suitable for connection loss to be kept low. Further, the cladding non-circularity was 0.20 μm, which was equal to or less than 0.40 μm suitable for connection loss to be kept low.

A sample 9 was manufactured by forming at "f=0.32" a portion having a thickness corresponding to a thickness of 0.01367 L, from a position corresponding to an porous preform outer diameter of 0.500 L. The core eccentricity of the optical fiber was 0.24 μm, which was equal to or less than 0.40 μm suitable for connection loss to be kept low. Further, the cladding non-circularity was 0.16 μm, which was equal to or less than 0.40 μm suitable for connection loss to be kept low.

A sample 10 was manufactured by forming under a condition where "f=0.33" a portion having a thickness corresponding to a thickness of 0.02188 L, from a position corresponding to an porous preform outer diameter of 0.955 L. The core eccentricity of the optical fiber was 0.51 μm, which was greater than 0.40 μm suitable for connection loss to be kept low. The cladding non-circularity was 0.39 μm, which was equal to or less than 0.40 μm suitable for connection loss to be kept low.

A sample 11 was manufactured by forming under a condition where "f=0.20" a portion having a thickness corresponding to a thickness of 0.03281 L, from a position corresponding to an porous preform outer diameter of 0.955 L. The core eccentricity of the optical fiber was 0.43 μm, which was greater than 0.40 μm suitable for connection loss to be kept low. The cladding non-circularity was 0.28 μm, which was equal to or less than 0.40 μm suitable for connection loss to be kept low.

A sample 12 was manufactured by forming under a condition where "f=0.34" a portion having a thickness corresponding to a thickness of 0.02735 L, from a position corresponding to an porous preform outer diameter of 0.800 L. The core eccentricity of the optical fiber was 0.40 μm, which was equal to 0.40 μm suitable for connection loss to be kept low. The cladding non-circularity was 0.36 μm, which was equal to or less than 0.40 μm suitable for connection loss to be kept low.

circularity was 0.31 μm, which was equal to or less than 0.40 μm suitable for connection loss to be kept low.

A sample 16 was manufactured by forming under a condition where "f=0.49" a portion having a thickness corresponding to a thickness of 0.00711 L, from a position corresponding to a porous preform outer diameter of 0.993 L. The core eccentricity of the optical fiber was 0.17 μm, which was equal to or less than 0.40 μm suitable for connection loss to be kept low. Further, the cladding non-circularity was 0.33 μm, which was equal to or less than 0.40 μm suitable for connection loss to be kept low.

A sample 17 was manufactured by forming under a condition where "f=0.57" a portion having a thickness corresponding to a thickness of 0.022 L, from a position corresponding to a porous preform outer diameter of 0.978 L. (Namely, the portion was formed to the final outer diameter corresponding to L.) The core eccentricity of the optical fiber was 0.18 μm, which was equal to or less than 0.40 μm suitable for connection loss to be kept low. Further, the cladding non-circularity was 0.20 μm, which was equal to or less than 0.40 μm suitable for connection loss to be kept low.

A sample 18 was manufactured by forming under a condition where "f=0.01" a portion having a thickness corresponding to a thickness of 0.01094 L, from a position

TABLE 2

|  | Sample 13 | Sample 14 | Sample 15 | Sample 16 | Sample 17 | Sample 18 | Sample 19 |
| --- | --- | --- | --- | --- | --- | --- | --- |
| a | 0.01 | 0.51 | 0.00 | 0.49 | 0.57 | 0.01 | 0.51 |
| Outer diameter [mm] | 0.978L | 0.978L | 0.993L | 0.993L | 0.978L | 0.978L | 0.978L |
| Thickness [mm] | 0.00273L | 0.00055L | 0.00382L | 0.00711L | 0.022L | 0.01094L | 0.02188L |
| Core eccentricity [μm] | 0.21 | 0.15 | 0.25 | 0.17 | 0.18 | 0.32 | 0.20 |
| Non-circularity [μm] | 0.25 | 0.27 | 0.31 | 0.33 | 0.20 | 0.41 | 0.44 |

A sample 13 was manufactured by forming under a condition where "f=0.01" a portion having a thickness corresponding to a thickness of 0.00273 L, from a position corresponding to an porous preform outer diameter of 0.978 L. The core eccentricity of the optical fiber was 0.21 μm, which was equal to or less than 0.40 μm suitable for connection loss to be kept low. Further, the cladding non-circularity was 0.25 μm, which was equal to or less than 0.40 μm suitable for connection loss to be kept low.

A sample 14 was manufactured by forming under a condition where "f=0.51" a portion having a thickness corresponding to a thickness of 0.00055 L, from a position corresponding to a porous preform outer diameter of 0.978 L. The core eccentricity of the optical fiber was 0.15 μm, which was equal to or less than 0.40 μm suitable for connection loss to be kept low. Further, the cladding non-circularity was 0.27 μm, which was equal to or less than 0.40 μm suitable for connection loss to be kept low.

A sample 15 was manufactured by forming under a condition where "f=0.00" a portion having a thickness corresponding to a thickness of 0.00382 L, from a position corresponding to a porous preform outer diameter of 0.993 L. The core eccentricity of the optical fiber was 0.25 μm, which was equal to or less than 0.40 μm suitable for connection loss to be kept low. Further, the cladding noncorresponding to a porous preform outer diameter of 0.978 L. The core eccentricity of the optical fiber was 0.32 μm, which was equal to or less than 0.40 μm suitable for connection loss to be kept low. However, the cladding non-circularity was 0.41 μm, which was equal to or greater than 0.40 μm suitable for connection loss to be kept low.

A sample 19 was manufactured by forming under a condition where "f=0.51" a portion having a thickness corresponding to a thickness of 0.02188 L, from a position corresponding to a porous preform outer diameter of 0.978 L. The core eccentricity of the optical fiber was 0.20 μm, which was equal to or less than 0.40 μm suitable for connection loss to be kept low. However, the cladding non-circularity was 0.44 μm, which was equal to or greater than 0.40 μm suitable for connection loss to be kept low.

The optical fiber glass preform manufacturing method configured as described above: is a method for manufacture of the optical fiber glass preform, the method including depositing glass particles on a base material, the glass particles being generated by glass making feedstock gas being supplied while a burner and the base material that is rotating are caused to reciprocate relatively to each other; and enables core eccentricity to be reduced, by, when a portion corresponding to an outer diameter equal to or greater than 0.80 L and equal to or less than L is deposited, where a final outer diameter of a portion of the optical fiber glass preform manufactured is L, the portion being formed by the deposition of glass particles: deposition being performed under a first condition where an angle formed between lines joining the center O of a cross section of the base material respectively with a rotational position r0 at start of the reciprocation and a rotational position r1 where the reciprocation returns to the original position after one round trip is an angle excluding 0°, 120°, 240°, 72°, 144°, 216°, and 288°; or deposition being performed under a second condition where the angle is 120° or 240°, over a thickness corresponding to a thickness equal to or less than 0.03 L; or deposition being performed under a third condition where the angle is 72°, 144°, 216°, or 288°, over a thickness corresponding to a thickness equal to or less than 0.02 L; or deposition being performed under a fourth condition where the angle is 0°, over a thickness corresponding to a thickness equal to or less than 0.01 L.

Further, when the portion corresponding to the outer diameter equal to or more than 0.80 L and equal to or less than L is deposited, by deposition being performed under a fifth condition where the angle formed between lines joining the center O of the cross section of the base material respectively with the rotational position r0 at the start of the reciprocation and the rotational position r1 where the reciprocation returns to the original position after one round trip is an angle excluding 180°, or deposition being performed under a sixth condition where the angle is 180°, over a thickness corresponding to a thickness equal to or less than 0.02 L; non-circular formation is prevented.

In addition, by deposition being performed while the rotation velocity r (rpm) of the target rod 1 and the relative motion velocity V (mm/min) between the target rod 1 and the glass particle synthesizing burner 4 are changed such that the glass particle deposition layer of a portion deposited per unit time has a desired density; reduction in density is able to be prevented and core eccentricity is able to be prevented.

Further, when optical fibers small in mode field diameter (MFD) are connected to each other, the larger the core eccentricities of the optical fibers are, the larger their connection loss is. Therefore, the optical fiber glass preform manufacturing method according to the present disclosure is able to be used suitably in particular to manufacture an optical fiber having a mode field diameter equal to or less than 9.1 µm at a wavelength of 1.31 µm.

An example of a refractive index profile of an optical fiber glass preform, from which an optical fiber having a mode field diameter equal to or less than 9.1 µm at a wavelength of 1.31 µm is obtained, is illustrated in FIG. 7. The optical fiber glass preform 30 has: a core portion (target rod 1) formed of a first core portion that is a core portion 6 positioned at the center, and a second core portion that is an outer layer 1a surrounding the first core portion; and a cladding 11 surrounding the second core portion. For example, a relative refractive-index difference Δ1 of the first core portion with respect to the cladding 11 is 0.34% to 0.50%, and a relative refractive-index difference Δ2 of the second core portion with respect to the cladding 11 is −0.02% to 0.11%. An outer diameter a1 of the first core portion is 7 µm to 9 µm, and an outer diameter a2 of the second core portion is 22 µm to 45 µm. FIG. 7 illustrates a case where Δ2 is a negative value, but when Δ2 is positive, a profile like stairs is obtained from the first core portion to the cladding.

The optical fiber glass preform manufacturing method according to the present disclosure is not limited to the above described embodiment, and the shape of the glass particle synthesizing burner, the number of burners, the arrangement of the burner, and the like may be modified as appropriate, without departing from a scope of the present disclosure.

For example, the number of glass particle synthesizing burners 4 is not necessarily one, and plural glass particle synthesizing burners 4 may be arranged at predetermined intervals in a circumferential direction around the target rod 1 (or the glass particulate deposit 5) and moved simultaneously with one another or sequentially; and any modification may be made as appropriate, as long as the modification enables core eccentricity to be prevented, and non-circular formation of cladding portions to be prevented.

Further, it has been described that only one glass particle synthesizing burner 4 is configured to move in the axial direction of the glass particulate deposit 5, but the number of glass particle synthesizing burners 4 is not necessarily one, and plural glass particle synthesizing burners 4 may be juxtaposed in the axial direction.

Further, the manufacturing method according to the present disclosure is not limited to the case where the OVD method is used, and may be applied to a case where the plasma OVD method, the MCVD method, or the plasma CVD method is used. For example, if the MCVD method or the plasma CVD method is used, the rotating base material corresponds to a glass tube, the burner corresponds to a burner that heats the glass tube from outside the glass tube, and the final outer diameter L of the portion of the optical fiber glass preform manufactured, the portion being formed by deposition of glass particles, corresponds to a post-collapse outer diameter of an outermost peripheral surface of a glass layer formed of the glass particles (that is, a boundary surface between the glass layer and the glass tube). Deposition of a portion corresponding to an outer diameter equal to or more than 0.80 L and equal to or less than L is performed under, for example, the first condition, the deposition being at the start of synthesis and deposition of glass particles, the deposition largely influencing the shape of the optical fiber glass preform in the MCVD method.

The present disclosure provides an effect of enabling implementation of an optical fiber glass preform manufacturing method that enables core eccentricity to be reduced.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing an optical fiber glass preform, the method comprising:
   depositing glass particles on a base material, the glass particles being generated by glass making feedstock gas being supplied while a burner and the base material that is rotating are reciprocated relatively to each other, wherein
   when a portion corresponding to an outer diameter equal to or more than 0.80 L and equal to or less than L is deposited, wherein L represents a final outer diameter of a part of the optical fiber glass preform manufactured, the part being formed by the deposition of the glass particles, the deposition to be performed is selected from among:
   a first condition where an angle formed by a first line extending from a center O of a cross section of the base material to a rotational position r0 at which one round trip of the relative reciprocation starts and a second line extending from the center O to a rotational position r1 at which the one round trip of the relative reciprocation ends is an angle excluding 0°, 120°, 240°, 72°, 144°, 216°, and 288°;

a second condition where the angle is 120° or 240°, thereby to deposit the glass particles to a thickness corresponding only to a thickness equal to or less than 0.02 L;

a third condition where the angle is 72°, 144°, 216°, or 288°, thereby to deposit the glass particles to a thickness corresponding only to a thickness equal to or less than 0.03 L;

a fourth condition where the angle is 0°, thereby to deposit the glass particles to a thickness corresponding only to a thickness equal to or less than 0.01 L, and a fifth condition where the angle is 180°, thereby to deposit the glass particles to a thickness corresponding only to a thickness equal to or less than 0.02 L, and the deposition under the selected condition is performed.

2. The optical fiber glass preform manufacturing method according to claim 1, wherein the deposition is performed while rotation velocity r (rpm) of the base material and relative motion velocity V (mm/min) between the base material and the burner are changed, such that a glass particle deposition layer of a portion deposited per unit time has a desired density.

3. The optical fiber glass preform manufacturing method according to claim 2, wherein the optical fiber glass preform is manufactured such that the optical fiber glass preform has a refractive index profile where a mode field diameter of an optical fiber obtained by stretching of the optical fiber glass preform is equal to or less than 9.1 µm at a wavelength of 1.31 µm.

4. The optical fiber glass preform manufacturing method according to claim 1, wherein the optical fiber glass preform is manufactured such that the optical fiber glass preform has a refractive index profile where a mode field diameter of an optical fiber obtained by stretching of the optical fiber glass preform is equal to or less than 9.1 µm at a wavelength of 1.31 µm.

* * * * *